B. G. BRAINE.
FIBER FASTENING FOR INSULATED RAIL JOINTS.
APPLICATION FILED FEB. 23, 1909.
996,204.
Patented June 27, 1911.
2 SHEETS—SHEET 1.
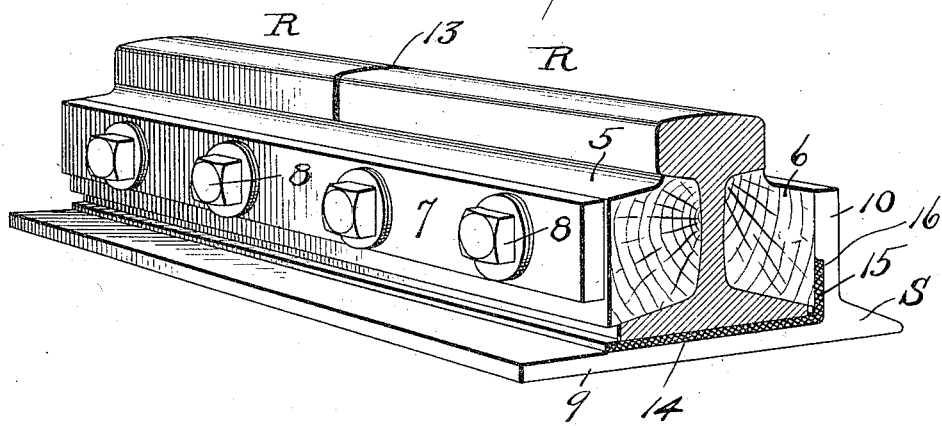
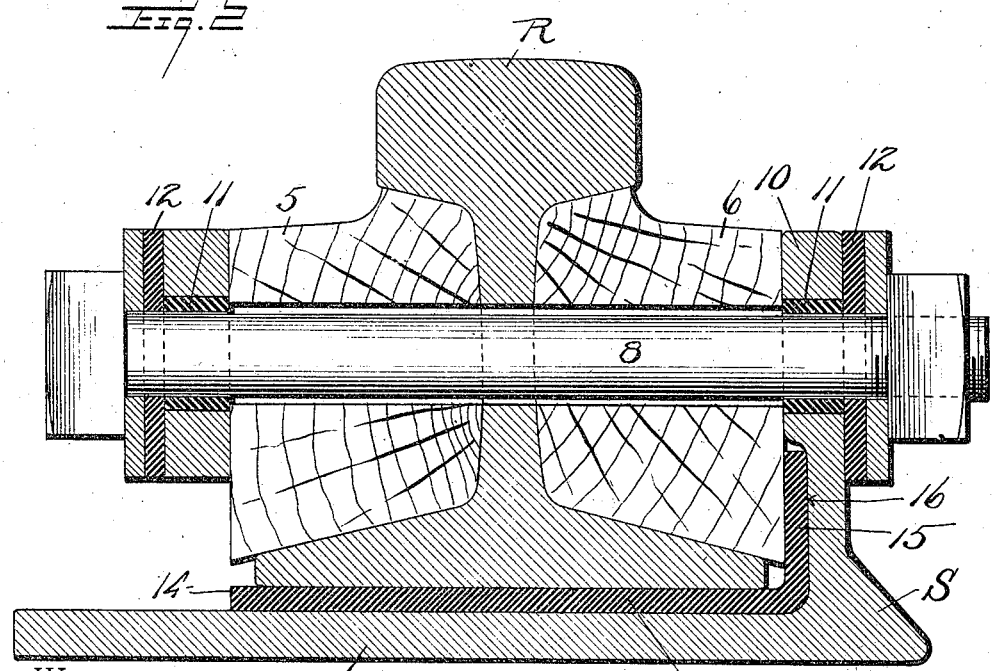
WITNESSES:
INVENTOR
Bancroft G. Braine
BY
D. P. Wolhaupter
his Attorney B. G. BRAINE.
FIBER FASTENING FOR INSULATED RAIL JOINTS.
APPLICATION FILED FEB. 23, 1909.
996,204.
Patented June 27, 1911.
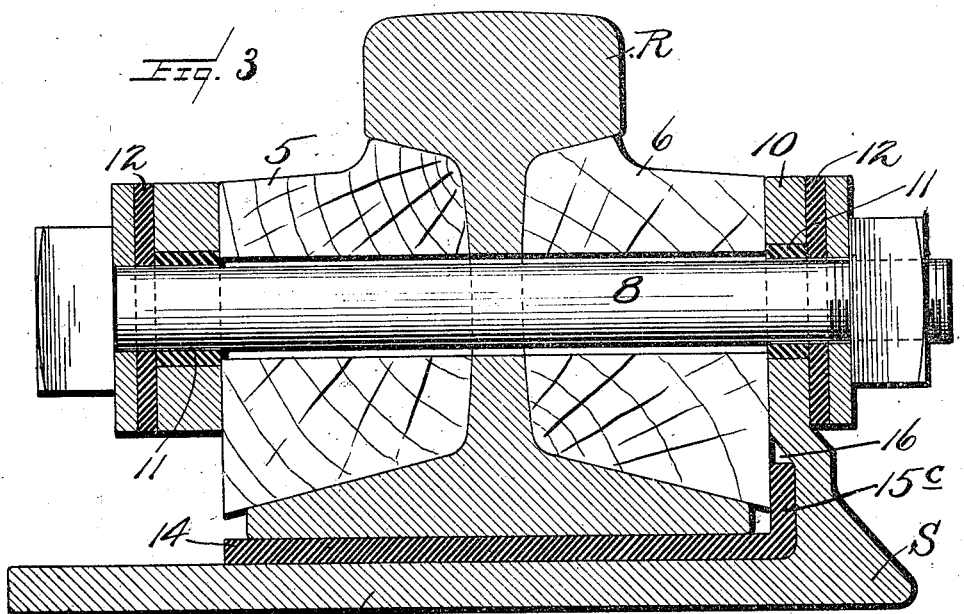

UNITED STATES PATENT OFFICE.

BANCROFT G. BRAINE, OF NEW YORK, N. Y., ASSIGNOR TO THE RAIL JOINT COMPANY, OF NEW YORK, N. Y., A CORPORATION OF NEW YORK.

FIBER FASTENING FOR INSULATED RAIL-JOINTS.

996,204.

Specification of Letters Patent. Patented June 27, 1911.

Application filed February 23, 1909. Serial No. 479,456.

*To all whom it may concern:*

Be it known that I, BANCROFT G. BRAINE, a citizen of the United States, residing at New York city, in the county of New York and State of New York, have invented certain new and useful Improvements in Fiber Fastenings for Insulated Rail-Joints, of which the following is a specification.

The present invention relates to the subject of insulated rail joints, and has particularly in view a practical improvement in the positioning and fastening of the insulation for joints of that character.

To this end the invention primarily contemplates a simple, practical and thoroughly reliable improvement in the means for fastening the base fiber or insulation of the Weber type of insulated rail joints, wherein a base insulating sheet is interposed between the bases of the rails and the base plate member of the angle shoe or chair.

The Weber type of insulated rail joint represents a standard construction recognized by railway engineers as possessing great utility both as a secure and thoroughly satisfactory splice for joining the rail ends together, as well as meeting every requirement in service as a thoroughly and effectively insulated rail joint, and it is the purpose of the present invention to preserve each and all of the desirable functions of the Weber type of insulated rail joint, while at the same time improving the insulating features thereof by providing definite and positive means for reliably holding the base insulation or fiber in place without the necessity of employing any extra parts or devices as a fastening means. Hence, the present invention is intended to so secure the base insulation or fiber of an insulated rail joint, particularly of the Weber type, by means of the standard parts of the joints, as to positively prevent creeping or displacement of such insulation in any direction, while at the same time not interfering with convenient and ready insulation renewals. It is by reason of thus securing the base insulation or fiber of such an insulated rail joint against shifting or creeping, that a substantial saving is effected in the insulating material or fiber which is employed as the base insulation between the bases of the rails and the base member of the angle shoe or chair.

With these and many other objects in view, which will readily appear to those skilled in the art as the nature of the invention is better understood, the same consists in the novel construction, combination, and arrangement of parts hereinafter more fully described, illustrated, and claimed.

The essential features of the invention involved in carrying out the objects above indicated are necessarily susceptible to structural modification, and to embodiment in divers forms of construction, without departing from the spirit or scope of the invention, but a few of the preferred embodiments of the latter are shown in the accompanying drawings, in which:

Figure 1 is a sectional end view of an insulated rail joint of the Weber type, embodying the improved fastening means for holding the base insulation in fixed position. Fig. 2 is a vertical cross sectional view of the form of construction shown in Fig. 1, the line of section including one of the joint bolts. Fig. 3 is a similar view illustrating a slight structural modification in the fastening means.

Like references designate corresponding parts in the several figures of the drawings.

As above indicated, the present invention possesses special utility in connection with the Weber type of insulated rail joint, though the same is necessarily capable of general application to any similar type of rail joint embodying in its organization a rail supporting base plate member and splice or filler members capable of being so arranged as to have a clamping engagement with the base insulation sheet. However, for illustrative purposes, the invention is shown in the drawings in its application to a Weber insulated rail joint, which class of joint essentially comprises, in combination with the service rails R, R, an angle shoe or rail chair S, the oppositely arranged side filler members 5 and 6, the bolt strap 7 arranged against the outer side of the filler member 5 at one side of the joint, and the usual series of joint bolts 8. The angle shoe or rail chair S is of conventional design, that is, consisting of an angle plate provided with a horizontal rail supporting base plate member 9, and an upright side girder member 10 arising from one edge portion of the base plate member at the outer side of the joint and lying against the outer side of the filler block 6. These are the usual and well known parts of a Weber rail joint, and to provide for insulating a joint of this character, it is understood that the side filler blocks 5 and 6 fitting in the fishing spaces of the rails and against the under sides of the rail heads, provide a substantial and thoroughly practical side insulation which is usually supplemented by the employment of suitable bolt insulating means, such for instance as the insulating washers 12 and the sleeves 11 lining the bolt holes in the side member 10 of the shoe and in the bolt strap 7. Also, in the Weber insulated rail joint, there is employed the usual insulating end post 13 between the rail ends, and a base insulation sheet 14 interposed between the bases of the rails and the upper surface of the rail supporting base plate 9 of the angle shoe. Now, according to the present invention, it is proposed to provide a definite and secure fastening for the base insulation sheet 14 so as to positively prevent creeping or shifting thereof with a consequent saving in the proportion of base plate fiber usually employed for the base insulation sheets 14. The improvement contemplated for this purpose resides in providing the insulation sheet 14 at one edge thereof with an integral upturned holding flange extension 15 which is adapted to be clampingly engaged by the joint parts when tightened up. In one suggested form of the invention this holding flange 15, as shown in Fig. 2 of the drawings, has a substantial and material projection above the plane of the base plate and also above the rail flanges, said holding flange also lying substantially perpendicular and adapted to be clamped tightly between the outer face of the filler block 6 and the inner face of the upright member 10 of the angle shoe. Furthermore, in this form of the invention it is preferable to provide the inner face of said upright member of the angle shoe with a receiving recess or seat 16 to accommodate the holding flange extension 15 and also permit of the action described without interfering with the direct clamping engagement of the side member 10 against the adjacent filler block 6.

A modification of the invention suggested in Fig. 3, wherein the holding flange designated by 15°, may be of short projection above the horizontal plane of the main body of the insulation, but otherwise clamped and seated in the manner shown in Fig. 2 of the drawings.

Other modifications will suggest themselves to those skilled in the art, and it will therefore be understood that changes in the form, proportion, and minor details of construction may be resorted to without departing from the spirit or sacrificing any of the advantages of the invention.

I claim:

In an insulated rail joint, the combination with the rails, an angle shoe and a wooden filler block, said angle shoe having a receiving recess in the inner face of its upright member, of a base insulation sheet extending the full width of the rail base between the latter and the base of the shoe, and provided at one edge with an upstanding flange portion registering within said receiving recess and clampingly engaged by the outer flat side of the filler block.

In testimony whereof I hereunto affix my signature in the presence of two witnesses.

BANCROFT G. BRAINE.

Witnesses:
GORDON W. COLTON,
E. L. SCHERMERHON.